United States Patent [19]

Yamazaki et al.

[11] Patent Number: 5,543,955
[45] Date of Patent: Aug. 6, 1996

[54] OPTICAL SCANNING SYSTEM

[75] Inventors: Yoshihiro Yamazaki; Takashi Iizuka; Toshio Kasai, all of Tokyo, Japan

[73] Assignee: Asahi Kogaku Kogyo Kabushiki Kaisha, Japan

[21] Appl. No.: 360,947

[22] Filed: Dec. 21, 1994

[30] Foreign Application Priority Data

Dec. 29, 1993 [JP] Japan ................................. 5-074673
Dec. 29, 1993 [JP] Japan ................................. 5-350355

[51] Int. Cl.$^6$ ............................................. G02B 26/08
[52] U.S. Cl. ...................... 359/204; 250/234; 347/235
[58] Field of Search ................................. 359/196, 201,
359/204, 209, 210, 211, 216, 217, 218,
212, 223, 226; 346/108, 160; 250/234,
235, 236, 578.1; 347/134, 225, 233, 235,
241, 243

[56] References Cited

U.S. PATENT DOCUMENTS

| | | | |
|---|---|---|---|
| 4,823,002 | 4/1989 | Saito | 250/235 |
| 4,950,889 | 8/1990 | Budd et al. | 250/236 |
| 4,962,312 | 10/1990 | Matuura et al. | 250/236 |
| 4,968,876 | 11/1990 | Iima . | |
| 5,001,341 | 3/1991 | Negishi . | |
| 5,047,625 | 9/1991 | Iima et al. . | |
| 5,068,677 | 11/1991 | Matuura et al. | 359/206 |
| 5,087,813 | 2/1992 | Negishi . | |
| 5,113,279 | 5/1992 | Hanamoto et al. | 359/196 |
| 5,126,756 | 6/1992 | Ban | 347/232 |
| 5,136,160 | 8/1992 | Nakane et al. | 250/235 |
| 5,305,337 | 4/1994 | Araki et al. . | |
| 5,377,213 | 12/1994 | Honda . | |

*Primary Examiner*—Paul M. Dzierzynski
*Assistant Examiner*—Darren E. Schuberg
*Attorney, Agent, or Firm*—Greenblum & Bernstein P.L.C.

[57] ABSTRACT

An optical scanning system has an image reading scanning system for emitting a first scanning beam of light to read an image of an object, an image forming scanning system for emitting a second scanning beam of light to form an image on a light receiving surface, and a light receiving element. Each of the first and second scanning beams is incident on the light receiving element when each of the first and second scanning beams is located at an end portion of a scanning area, and the first scanning beam and the second scanning beam have different optical characteristics. The optical scanning system also has a circuit for generating a horizontal synchronous signal for the image reading optical system and the image forming optical system, respectively, in accordance with light received by the light receiving element.

27 Claims, 8 Drawing Sheets

OPTICAL SCANNING SYSTEM

BACKGROUND OF THE INVENTION

The present invention relates to an optical scanning device, and more specifically, an optical scanning device capable of reading and forming an image using a scanning laser beam.

Conventionally, in an image processing device such as a facsimile machine or digital copying machine having image reading and image forming functions, two optical systems (i.e., an image reading optical system and an image forming optical system) are provided. In a conventional image reading optical system, a surface of an original is illuminated by a light source such as a fluorescent lamp. The reflected light is directed to a sensor such as a linear CCD sensor by condenser and projecting lenses. The linear CCD sensor outputs line image data in a main scanning direction. A two dimensional image data of the original can be obtained by moving the linear CCD sensor relative to the original in an auxiliary scanning direction.

An example of a conventional image forming optical system can be found in an electrophotographic printer such as a laser beam printer. The laser beam printer has a laser emitting device, a deflector such as a polygon mirror, and a photoconductive drum. A laser beam modulated in accordance with the image data and emitted by the laser source is deflected by the polygon mirror, and is incident onto a uniformly charged circumferential surface of the photoconductive drum through an fθ lens. As the polygon mirror rotates, the laser beam scans the photoconductive drum in the direction of the axis of rotation of the photoconductive drum. During the scanning of the laser beam, the photoconductive drum is rotated, thereby a two-dimensional latent image is formed on the surface of the photoconductive drum. Then, toner is adhered to the latent image, and the toner image is transferred to a recording paper. The transferred image is then fixed.

However, with the above described construction, each of the optical scanning systems has a photo detector and associated hardware used for detecting the scanning laser beam at the end of each scan. This complicates the manufacturing of an apparatus using the two optical scanning systems, thereby increasing the cost of manufacturing the apparatus.

SUMMARY OF THE INVENTION

It is therefore an object of the invention to provide an improved optical scanning system with which an image reading operation and an image forming operation can be performed simultaneously, using a simple construction of the optical scanning system.

According to one aspect of the present invention, there is provided an optical scanning system, that may include an image reading scanning system for emitting a first scanning beam of light to read an image of an object, an image forming scanning system for emitting a second scanning beam of light to form an image on a light receiving surface, and a light receiving element. Each of the first and second scanning beams is incident on the light receiving element when each of the first and second scanning beams is located at an end portion of a scanning area, and the first scanning beam and the second scanning beam have different optical characteristics. The optical scanning system also comprises a circuit for generating a horizontal synchronous signal for the image reading optical system and the image forming optical system, respectively, in accordance with light received by the light receiving element.

Preferably, the optical scanning system comprises means for discriminating whether a received bee is the first scanning beam, the second scanning beam, or a combination of the first and second scanning beams, in accordance with an intensity of each of the first and second scanning beams.

Optionally, the circuit generates a first horizontal synchronous signal for an image reading operation when the received beam is the first scanning beam, and a second horizontal synchronous signal for an image forming operation when the received beam is the second scanning beam.

Alternatively, the image reading optical scanning system and the image forming optical scanning system have a common optical path.

Preferably, the common optical path includes a first beam splitter. Further, the image reading scanning system may include a first emitter for emitting the first scanning beam, and the image forming scanning system may include a second emitter for emitting the second scanning beam. The first beam splitter combines the first scanning beam and the second scanning beam.

optionally, the optical path further includes a second beam splitter, the second beam splitter having a reflecting portion. When the first and second scanning beams are incident on the reflecting portion, the first scanning beam is reflects toward the object, and the second scanning beam passes through the reflecting portion of the second beam splitter.

Preferably, the light receiving element is positioned such that when the first and second scanning beams are not incident on the reflecting portion of the second beam splitter, the first and second scanning beams are incident on the light receiving element.

Alternatively, the image forming scanning system further includes a mirror having a reflecting portion. The mirror reflects the second scanning beam which has passed through the second beam splitter and is incident on the reflecting portion of the mirror, the second scanning beam being reflects toward the light receiving surface.

optionally, the light receiving element is positioned such that when the second scanning beam is not incident on the reflecting portion of the mirror, the second scanning beam is incident on the light receiving element.

Still optionally, the mirror includes a transparent portion. The first and second scanning beams, which are not incident on the reflecting portion of the second beam splitter, pass through the transparent portion of the mirror and are incident on the light receiving element.

Preferably, the second beam splitter and the mirror are arranged such that the second beam splitter reflects the first scanning beam along a first path towards the object, and the mirror reflects the second scanning beam along a second path towards the light receiving surface.

According to another aspect of the present invention, there is provided an optical scanning system that may include a device for emitting a first scanning beam, a device for emitting a second scanning beam, a first device for reflecting the first scanning beam towards an object to be scanned when the first scanning beam is incident on a predetermined portion of the first reflecting device, and a second device for reflecting the second scanning beam towards a light receiving surface on which an image is to be formed when the second scanning beam is incident on a predetermined portion of the second reflecting device. The optical scanning system also include a light receiving device arranged to receive the first and second scanning beams when the first scanning beam is incident on a portion other than the predetermined portion of the first reflecting means, and when the second scanning beam is incident on a portion other than the predetermined portion of the second reflecting means. The light receiving device outputs a signal used to control the first and second scanning beams.

Preferably, the first scanning beam has a first wavelength, and the second scanning beam has a second wavelength which is different from the first wavelength. The predetermined portion of the first reflecting device reflects light having the first wavelength and allows light having the second wavelength to pass therethrough.

DESCRIPTION OF THE ACCOMPANYING DRAWINGS

DESCRIPTION OF THE EMBODIMENTS

A first embodiment of a scanning optical system will be described with reference to FIGS. 1 through 9.

The scanning optical system 10 has a reading optical system R and an image forming optical system W. The reading optical system R and the image forming optical system W have a common optical path, and common optical elements. Further, in the scanning optical system 10, a reading operation and an image forming operation can be executed simultaneously.

Hereinafter, in the specification, the term "main scanning direction" is defined as the direction in which the laser beam, deflected by a polygonal mirror 18, scans, i.e. the direction of the rotational axis of the photoconductive drum. Further, the term "auxiliary scanning direction" is defined as a direction perpendicular to a main scanning direction, i.e. the direction in which a photoconductive drum PD rotates.

Figure 1:
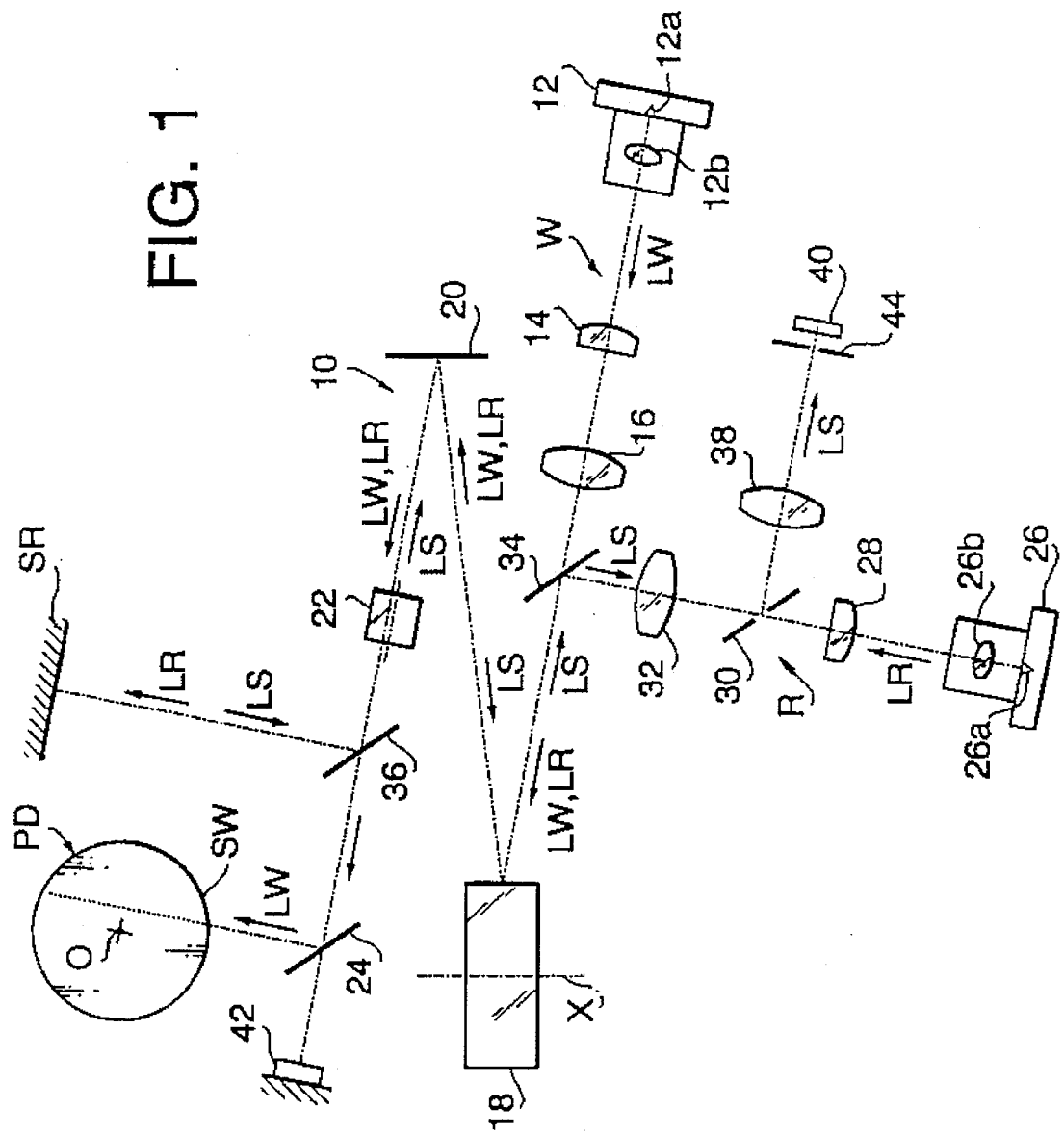
FIG. 1 is a schematic side view showing an arrangement of the optical scanning system in an auxiliary scanning direction.

FIG. 1 shows an arrangement of the scanning optical system 10 along an auxiliary scanning direction, according to a first embodiment of the present invention. The image forming optical system W of the optical scanning system 10 will be described below.

In the image forming optical system W, a collimator 12 is provided as a light source. A parallel light beam LW is emitted from the collimator 12 and transmitted through the cylindrical lens 14 and objective lens 16. The light beam LW then passes through beam splitter 34 and is incident on the polygonal mirror 18. The polygonal mirror 18 deflects the light to cylindrical mirror 20. The light beam LW is then reflected by the cylindrical mirror 20 and transmitted through the torio lens 22 to be incident on beam splitter 36. The beam splitter 36 allows the light LW to be transmitted to a mirror 24 where the light LW is reflected and incident on surface SW of the photoconductive drum PD to form an image thereon. The mirror 24 is formed (described later) such that at a beginning of a scan, the light LW passes through the mirror 24 and is incident on a light receiving element 42. The light receiving element 42 then outputs a horizontal synchronous signal which is used control the scanning of the laser beam LW.

The component of the image forming system mentioned above, will be described in more detail.

The collimator 12 has a semiconductor laser 12a and a collimator lens 12b. The semiconductor laser 12a emits the laser beam LW having a first predetermined wavelength $\lambda 1$, e.g., 780 nm, modulated in accordance with the image information. The collimator lens 12b collimates the laser beam LW thereby producing a parallel beam.

The optical axis of the collimator 12 is inclined with respect to the reflection cur faces of the polygonal mirror 18 in the auxiliary scanning direction, and crosses a rotational axis of the polygonal mirror 18. Further, the optical axis of the laser beam LW is incident on the polygonal mirror 18 at substantially the center of an angular range of the main scanning direction.

The cylindrical lens 14 has power only in the auxiliary scanning direction, and does not have power in the main scanning direction. The objective lens 16 has power both in the auxiliary scanning direction and the main scanning direction. The power of the cylindrical lens 14 and the power of the objective lens 16 are designed such that the circular cross-sectional laser beam LW is modified to be elongated in the main scanning direction, at a position adjacent to the reflection surface of the polygonal mirror 18. The power of the objective lens 16 is designed such that the laser beam LW emitted from the collimator 12 is focused behind the scanning surface SW of the photoconductive drum PD.

The beam splitter 34 is a dichroic mirror which allows a beam having the wavelength of $\lambda 1$ to pass through. Therefore, the laser team EW passes through the beam splitter 34, and is incident on the polygonal mirror 18.

Figure 2:
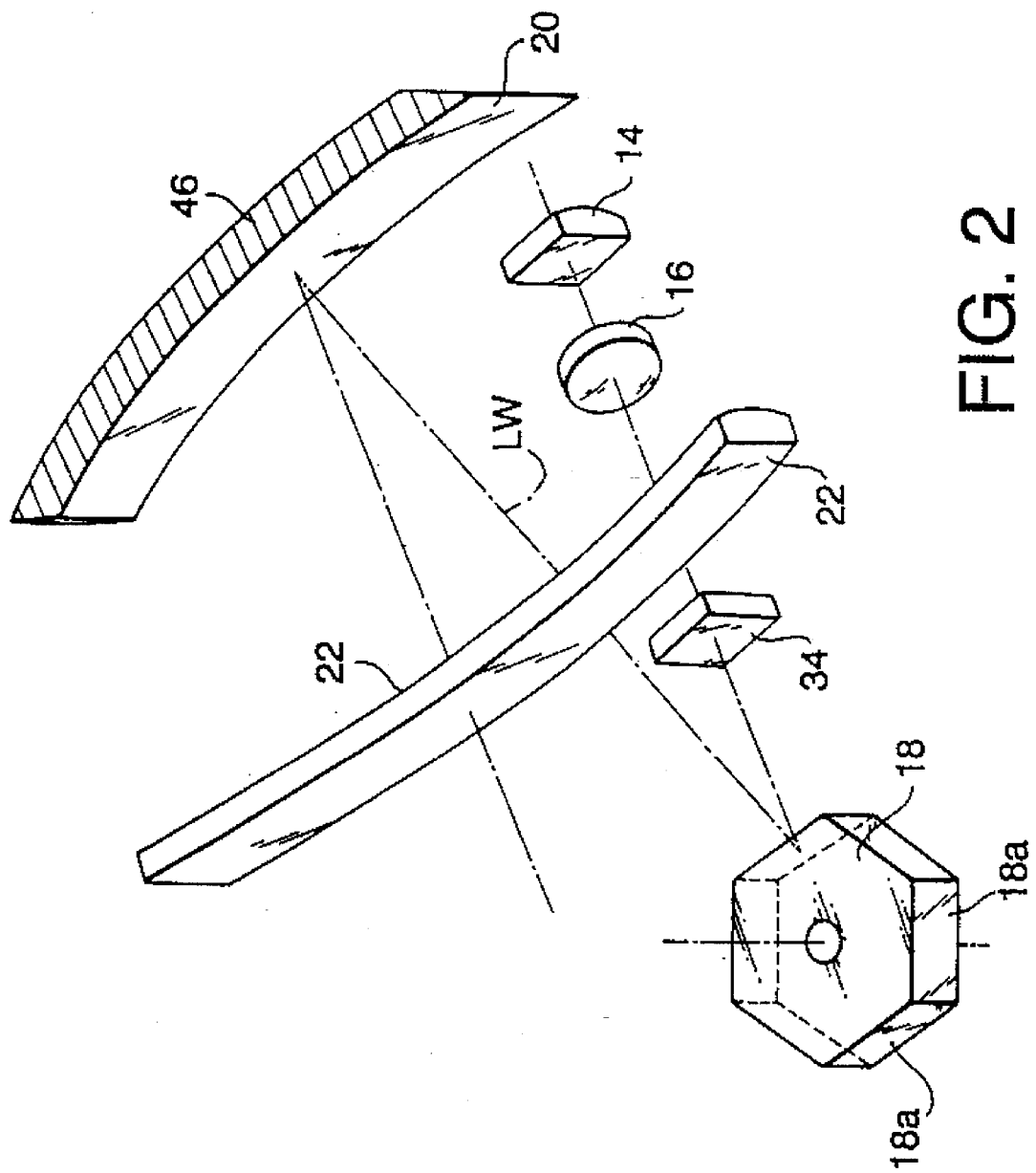
FIG. 2 is a perspective view of a modeled toric lens used in the optical scanning system shown in FIG. 1.

The polygonal-mirror 18 deflects the laser beam LW towards the cylindrical mirror 20 such that the laser beam LW scans in the main direction. The polygonal mirror 18 is driven by a motor (not shown) to rotate about a rotation axis X at a relatively high speed. The polygonal mirror 18 is provided with six flat reflection surfaces 18a, as shown in FIG. 2. Each of the reflection surfaces 18a is located the same distance from the rotational axis X. The reflection surfaces 18a are arranged parallel with the rotational axis of the polygonal mirror 18. Further, an angle of 120° is formed between each pair of adjacent surfaces 18a.

The cylindrical mirror 20 is formed such that the reflection surface is spherical along the main scanning direction, and flat in the auxiliary scanning direction. Therefore, the cylindrical mirror only has power in the main scanning direction and does not have power in the auxiliary scanning direction. Further, the laser beam incident to the cylindrical mirror 20 is inclined in the auxiliary scanning direction. Consequently, an image of the laser beam LW formed by the cylindrical mirror 20 is curved.

The toric lens 22 is arranged eccentrically and functions as an anamorphic lens having power only in the auxiliary scanning direction, and does not have power in the main scanning direction. The toric lens 22 has a shape such that it is has an opposite curvature to the curvature of the cylindrical mirror 20, in the main scanning direction as shown in FIG. 2. The power of the toric lens 22 at the central portion along the longitudinal portion is stronger than the power at the side portion thereof. Further, the toric lens 22 is arranged such that the optical axis thereof is shifted with respect to the optical axis of the scanning optical system 10 as shown in FIG. 1.

By arranging the toric lens 22 as described above, an optical axis of a noise component i.e., a beam reflected inside the toric lens 22, does not coincide with the optical axis of the optical scanning system 10. The power of the toric lens 22 is such that the laser beam which was reflected by the polygonal mirror 18, and the cylindrical mirror 20, passes through the toric lens 22 to form a linear image i.e., the curvature of the image is canceled, on the photoconductive surface SW.

Figure 3A:
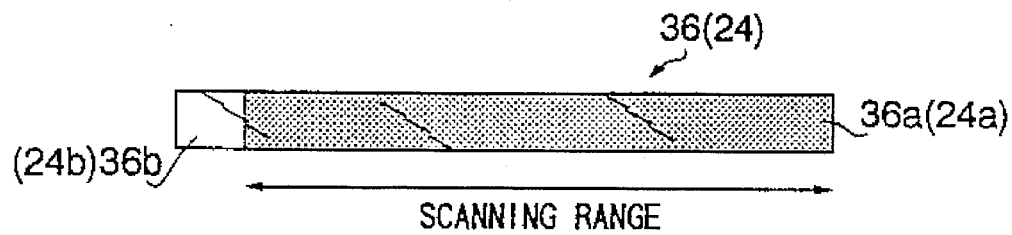
FIGS. 3A and 3B show cross-sections of mirrors and beam splitters used in the optical scanning system shown in FIG. 1.

The beam splitter 36 is also a dichroic mirror, and allows the beam LW having wavelength of λ1 to pass therethrough. As shown in FIG. 3A, the beam splitter 36 also extends in the main scanning direction, and has a dichroic mirror area 36a, and a transparent area 36b formed at an end portion thereof. Similarly, the mirror 24 extends in the main scanning direction, and has a reflection area 24a, and a transparent area 24b formed at an end portion thereof. Further, as shown in FIG. 1, the light receiving element 42 is provided behind the transparent portion 24b of the mirror 24, at a position conjugate with respect to the scanning surface SW. The light receiving element 42 receives the laser beam LW at every scan, and outputs a signal that is used for generating a horizontal synchronous signal BDW.

As described above, the scanning surface SW of the photoconductive drum PD is scanned by the laser beam LW in the main scanning direction. The photoconductive drum PD rotates while being exposed to the laser beam LW. Thus, a two-dimensional latent image is formed on the scanning surface SW of the photoconductive drum As shown in FIG. 1, the optical axis of the beam Lw incident on the photoconductive drum PD does not intersect the rotational axis of the photoconductive drum PD. Therefore, when the laser beam LW is reflected by the scanning surface sw, the reflected bee does not return along the incident path therefore the reflected beam is not incident on the collimator unit 12. If the reflected beam is incident on the collimator unit 12, a detector which detects the intensity of the emitted laser beam may receive the beam directly emitted by the semiconductor laser 12a as well as the reflected beam. Then the intensity of the emitted beam LW may not be maintained at a predetermined level. In order to avoid such a problem, the above-described arrangement is employed.

In the reading optical system R, a collimator 26 is provided as a light source. A parallel light beam LR is emitted from the collimator 26 and transmitted through cylindrical lens 28, a spatial beam splitter 30 and an objective lens 32. The light beam LR then passes through the beam splitter 34 and i.e. incident on the polygonal mirror 18.

The polygonal-mirror 18 deflects the light beam LR to cylindrical mirror 20 The light is then transmitted through the toric lens 22 to be incident on the beam splitter 36. The beam splitter 36 reflects the light LR to be incident on surface SR of an object to be read.

As described before, the bee splitter 36 has the transparent area 36b and the mirror 24 has the transparent area 24b. Therefore, at the beginning of a scan, the light LR passes through the beam splitter 36 and the mirror 24 and is incident on the light receiving element 42. The light receiving element 42 then outputs a horizontal synchronous signal which used to control the scanning of the laser beam LR.

The beam LR is scattered by the surface SR of the object to be read. A reflected laser beam LS which is part of the scattered laser beam returns along the same path as the incident laser beam LR. When the laser beam LS is incident on the spatial beam splitter 30, the laser beam LS is reflected to an anamorphic lens 38 which focuses the beam LS such that it passes through an opening in a light shield 44 and is incident on a light receiving element 40. The light receiving element outputs an image signal corresponding to the received laser beam LS.

The components of the reading optical system R that are not used in the imaging forming system W will be described in more detail below.

In the reading optical system R, a laser beam LR having a second wavelength λ2, e,g., 680 nm, is emitted by the collimator unit 26. The collimator unit 26 has a semiconductor laser 26a for emitting the laser beam LR and a collimator lens 26b for collimating the laser beam LR to produce a parallel beam.

The cylindrical lens 28 is similar to the cylindrical lens 14 and therefore has power only in the auxiliary scanning direction and does not have power in the main scanning direction. The objective lens 32 is similar to the objective lens 16 and therefore has power in both the main scanning direction and the auxiliary scanning direction. The beam splitter 34 reflects the laser beam LR having wavelength of λ2, to the polygon mirror 18. The optical axis of the laser beam passing through the beam splitter 34 and the optical axis of the laser beam reflected by the beam splitter 34 are coincident. Therefore, the laser beams LW and the laser beam LR are combined at the beam splitter 34.

As mentioned above the beam splitter 36 extends in the main scanning direction, and has a dichroic mirror area 36a, and transparent area 36b formed at an end portion thereof, and shown in FIG. 3A. When laser beam LR is incident on the dichroic mirror area 36a, the laser beam LR is reflected toward the surface SR of the object to be scanned.

When laser beam LR is incident on the transparent area 36b, the laser beam LR is transmitted to the mirror 24. At the mirror 24 the laser beam also passes through the transparent area 24b and is incident on the light receiving element 42. The light receiving element 42 is at a position conjugate with respect to the surface SR, and receives the laser beam LR at every scanning. The light receiving element 42 generates a horizontal synchronous signal BDR when an image is being read.

When the beam LR is scattered by the surface SR, the reflected beam LS is returned such that it is incident on the beam splitter 30, as described above. Further, the beam splitter 34 and the beam splitter 36 are inclined by 45 degrees with respect to the optical axis of the scanning optical system 10. Thus, the beam LS as reflected by the beam splitter 34, and further reflected by the spatial beam splitter 30, as shown in FIG. 1.

Figure 4:
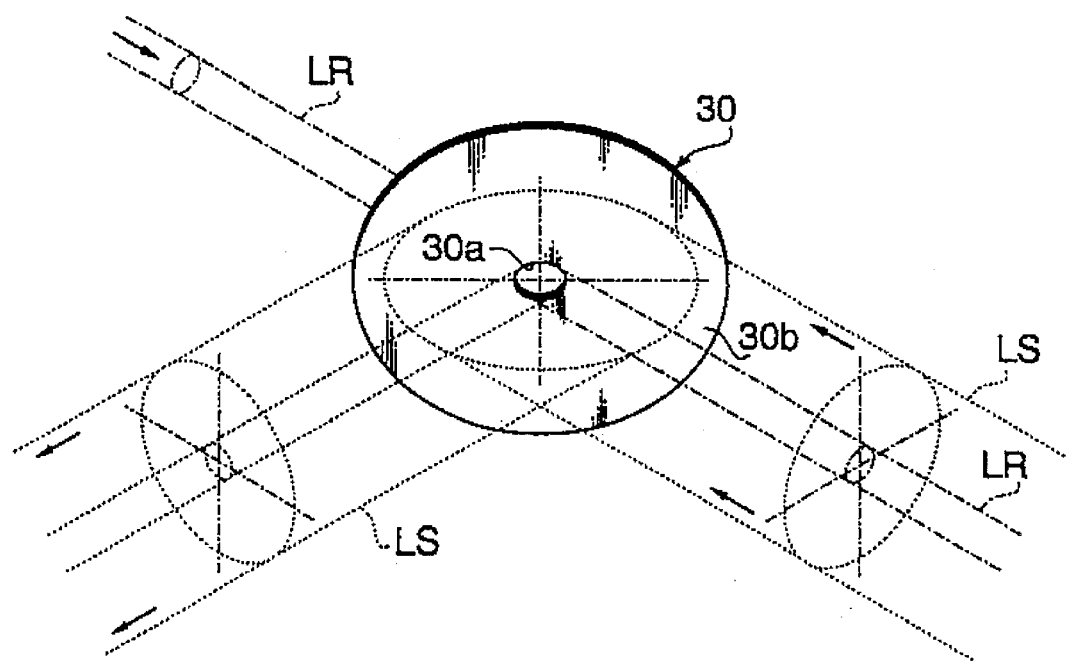
FIG. 4 is a perspective view of a mirror having an opening.

The spatial beam splitter 30 is a disk shaped mirror having a circular reflecting surface 30b and a small opening 30a at the central portion thereof, as shown in FIG. 4. The spatial beam splitter 30 is arranged to be inclined at 45° with respect to the optical axis of the laser beam LR that is emitted from the collimator unit 26.

The size of the opening 30a is determined such that the laser beam LR which is a substantially parallel beam, passes through the opening 30a without being eclipsed by an edge of the opening 30a. Since the reflected beam LS is a scatter beam (not a parallel beam), only a part of the reflected beam LS passes through the opening 30a, most of the beam LS is reflected by the reflecting surface 30b.

The size of the reflecting surface 30b determines the intensity of light directed to the light receiving element 40, and is designed taking the sensitivity of the light receiving element 40 into account.

The light receiving element 40 outputs the detection signal to an image reading device (not shown) in accordance with the intensity of the received light. Since the position of the surface SR can be identified based on the horizontal synchronous signal BDR, and the intensity of the scattered beam LS corresponds to the brightness of the image at the identified position, two-dimensional image information can be obtained.

The light shield plate 44 has an opening to allow the reflected beam LS to pass through, and prevents other light beams including ambient light from reaching the light receiving element 40. The light shielding plate 44 is conjugate with the surface SR of the object to be read, Further, as shown in FIG. 2, a light absorbing member 46 is provided on the top surface of the cylindrical mirror 20. The light absorbing member 46 prevents light reflected by the optical elements in the scanning optical system 10 from being incident on the light receiving element 40.

As described above, the scanning optical system 10 is capable of performing an image forming operation and a reading operation simultaneously, and independently of each other. Further, the single light receiving element 42 can generate both horizontal synchronous signals BDW and BDR independently, even if the image forming and reading operations are executed simultaneously.

Furthermore, as shown above, in the scanning optical system 10, in the optical path between the beam splitter 34 and the beam splitter 36, the polygonal mirror 18, the cylindrical mirror 20, and the toric lens 22 are used in both the reading optical system R and the image forming optical system W. Therefore, the imaging apparatus including both the image forming optical system and image reading optical system can be made compact, and the manufacturing cost can be reduced.

In the first embodiment, the cylindrical mirror 20 is provided between the polygonal mirror 18 and the surface SR of the object to be read. If a lens had been used instead of the cylindrical mirror 20, a beam of light incident on the lens may be repeatedly internally reflected inside the lens at the surfaces thereof. Therefore, in the first embodiment, a mirror is used instead of the lens. Thus, the noise due to the internal reflection inside the lens can be avoided.

Figure 5:
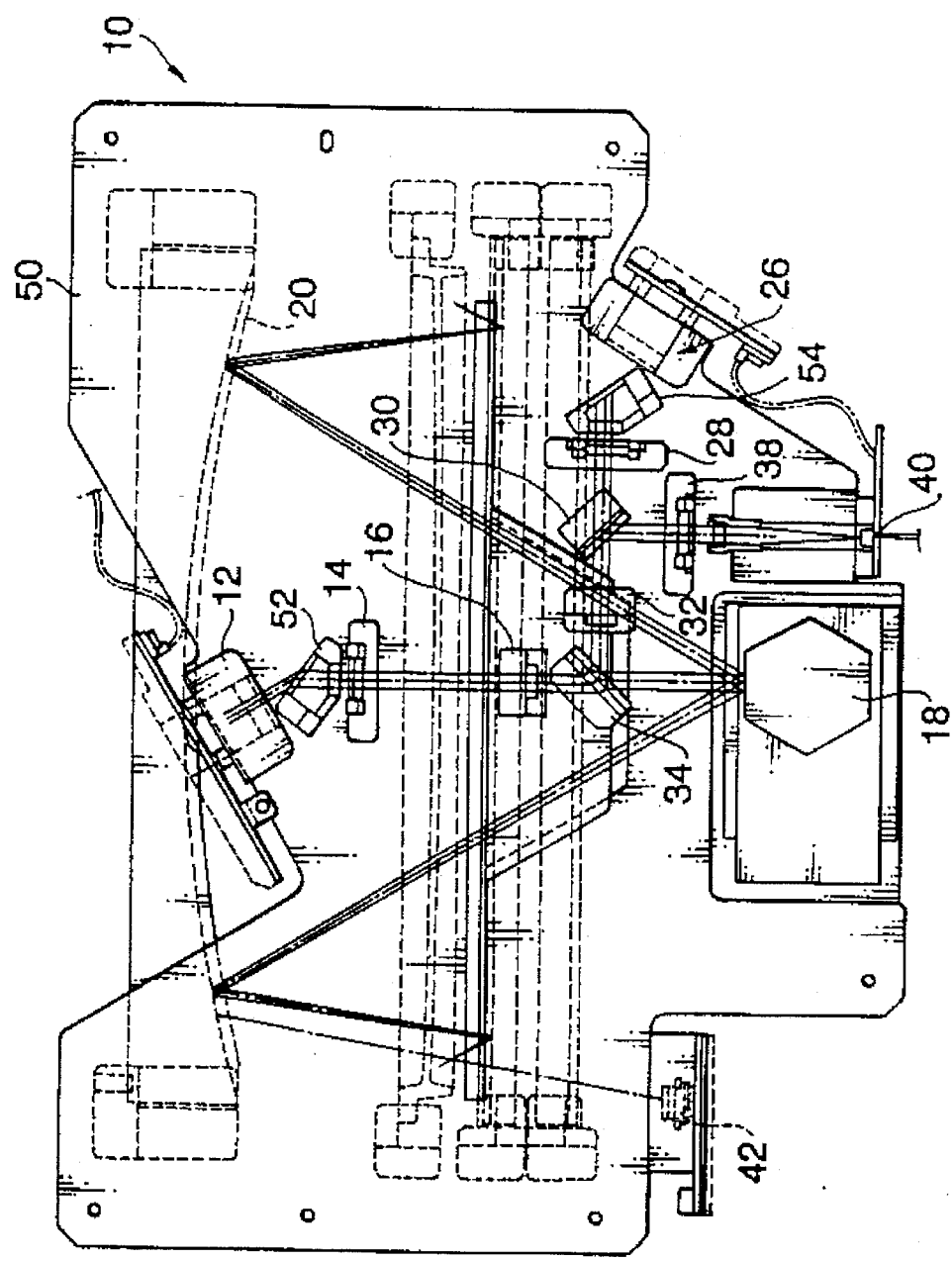
FIG. 5 is a bottom view of the optical scanning unit shown in FIG. 1.
Figure 6:
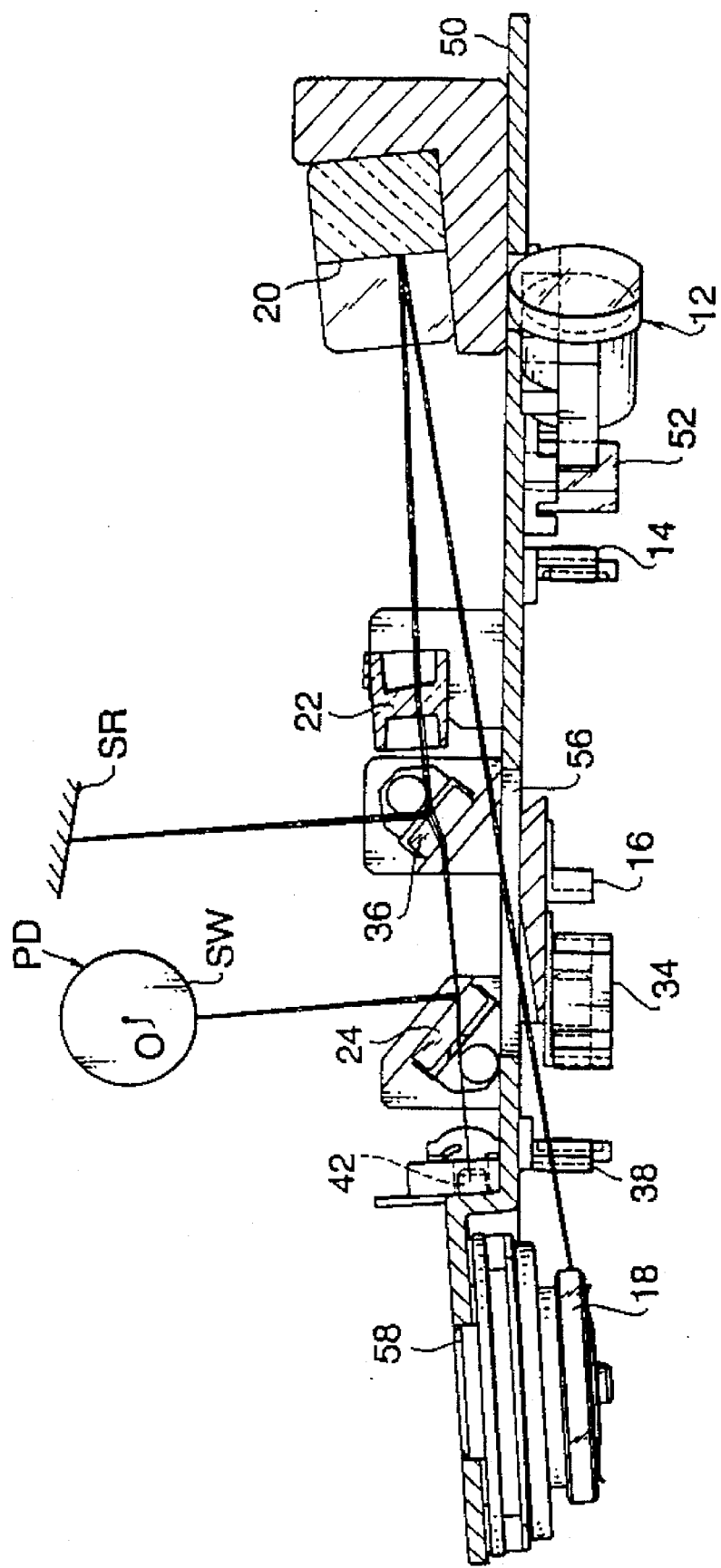
FIG. 6 is a side view of the optical scanning unit shown in FIG. 1.

FIG. 5 is a bottom view of the optical scanning unit 10 installed on a base plate 50, showing an arrangement of the optical components. FIG. 6 is a schematic sectional view of FIG. 5. All of the above described optical elements are mounted on the base plate 50.

The collimator unit 12, the cylindrical lens 14, the objective lens 16, the polygon mirror 18, the collimator unit 26, the objective lens 28, the first beam splitter 30, the objective lens 32 the beam splitter 34, the anamorphic lens 38, the light receiving element 40 are mounted on a lower surface of the base plate 50. The collimator unit 12 and 26 output the laser beams LW and LR, respectively, which are substantially parallel to the lower surface of the base plate 50. The rotation axis X of the polygon mirror 18 is inclined with respect to the lower surface of the base plate by a predetermined angle.

A beam expander 52 for expanding the diameter of the laser beam is provided, between the collimator unit 12 and the cylindrical lens 14. Another beam expander 54 is provided between the collimator unit 26 and the cylindrical lens 28.

As shown in FIG. 6, the cylindrical mirror 20, the toric lens 22, the beam splitter 36, the mirror 24 and the light receiving element 42 are mounted on the upper side of the base plate 50. An opening 56 extending along the main scanning direction is formed on the base plate 50. The laser beam deflected by the polygon mirror 18 passes through the opening 56 and is incident on the cylindrical mirror 20.

The mirror 24 and the beam splitter 36 are arranged such that the reflected beams (i.e., the beams incident to the photoconductive surface and the original), are parallel to each other. Therefore, the laser beam LR for reading an image, and the laser beam LW for forming an image are transmitted in the same direction.

Figure 3B:
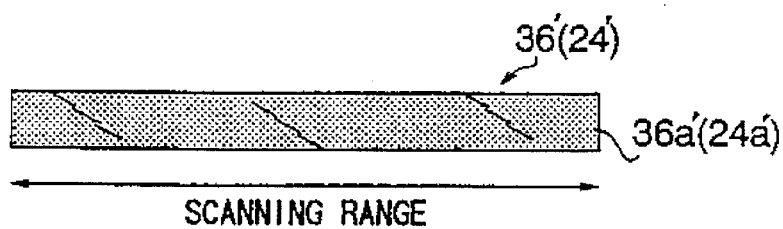

As described above, the end portions of the mirror 24 and the beam splitter 36 (dichroic mirror) are formed to be transparent (or, as a non-evaporated surface) such that the laser beam incident on the end portions passes through, and is incident on the light receiving element 42 located behind the mirror 24. However, as shown in FIG. 3B it is possible to have a beam splitter 36' and the mirror 24' formed such that a width thereof is equivalent to a width of reflecting portions 36a' and 24a', respectively. Further, the width of each of the reflecting portions 36a' and 24a' corresponds to the scanning area and therefore are similar to the reflecting portions 36a and 24a shown in FIG. 3A. Therefore, at the beginning of scan, the laser beams LR and LW would pass beside the beam splitter 36 and mirror 24 in order to be incident on the light receiving element 42.

Figure 7:
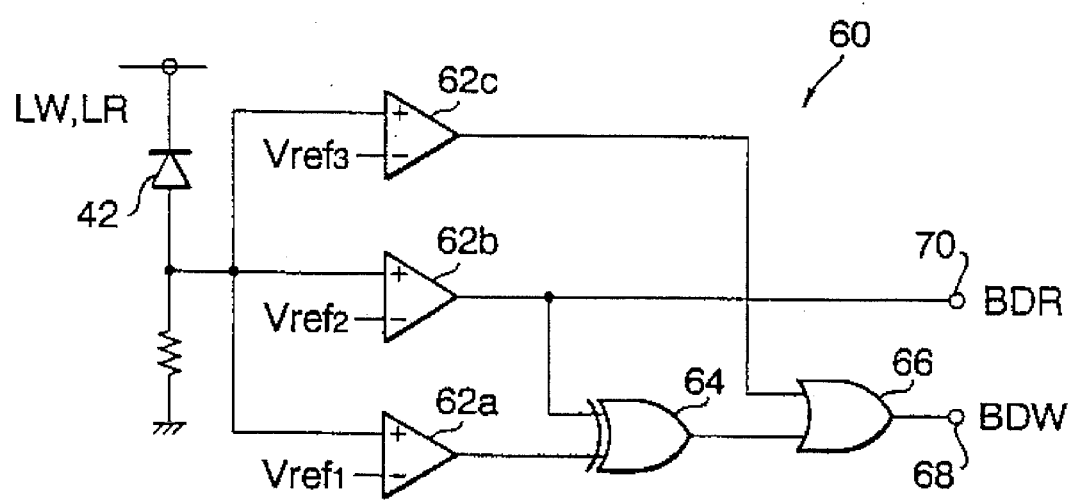
FIG. 7 shows a schematic of a synchronous detection circuit used with a light receiving detector employed in the present invention.

FIG. 7 shows a synchronous detection circuit 60 using the single light receiving element 42. The synchronous detection circuit 60 has a first comparator 62a, a second comparator 62b and a third comparator 62c. Voltages of input signals are compared with first, second and third reference voltages Vref1, Vref2 and Vref3 by the first, second and third comparators, respectively. Further, output signals of the first and second comparators 62a and 62c are inputted into an Exclusive OR gate 64, and an output signal of the third comparator 62c and an output signal of the Exclusive OR gate 64 are inputted to an OR gate 66.

Using the above configuration, by detecting the output of the comparator 62b, i.e., by detecting the voltage at terminal 70, the horizontal synchronous signal BDR of the reading operation can be obtained. By detecting the output of the OR circuit 66, i.e., by detecting the voltage of terminal 68, the horizontal synchronous signal BDW of the image forming operation can be obtained.

According to the construction of the first embodiment, the voltage generated by the light receiving element 42 when the beam for reading is received is smaller than the voltage when the beam for writing is received. Thus, by comparing the output voltage of the light receiving element 42 with a reference value, the received beams can be distinguished.

Thus, if the light receiving element 42 is arranged to receive the scanning lines of the reading and/or writing beams, the horizontal synchronous signals BDW and BDR for each of the beams can be generated independently from each other.

Figure 8:
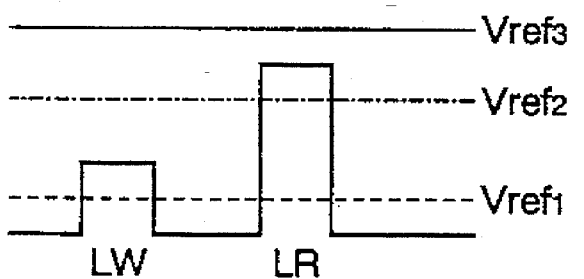
FIGS. 8 and 9 show diagrams of outputs of voltages from the synchronous detection circuit shown in FIG. 7, when the beam LR and LW are received.

The first and second reference voltages Vref1 and Vref2 are determined such that the output voltage of the light receiving element 42, when the laser beam LR of the reading operation is incident on the light receiving element 42, is substantially half the sum of the first voltage vref1 and the second reference voltage Vref2, as shown in FIG. 8.

Figure 9:
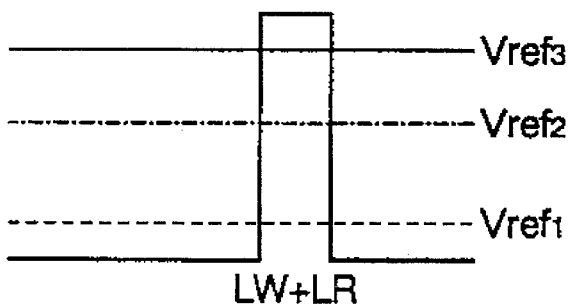

Similarly, the reference voltage Vref3 is determined such that the output voltage of the light receiving element 42, when the laser beam LW of the writing operation is incident on the light receiving element 42, is substantially half a sum of the second voltage Vref2 and the third reference voltage Vref3, as shown in FIG. 9.

Further, the reference voltage Vref3 is determined such that the sum of the output voltages of the light receiving element 42, when the reading and writing beams are incident on the light receiving element 42, is greater than the third reference voltage Vref3.

In Table 1, a status of the beams LW and LR, and the outputs of the comparators, and OR gates are shown.

TABLE 1

| LW | LR | 62a | 62b(70) | 62a | 64 | 66(68) |
|---|---|---|---|---|---|---|
| OFF | OFF | OFF | OFF | OFF | OFF | OFF |
| ON | OFF | ON | OFF | OFF | ON | ON |
| OFF | ON | ON | ON | OFF | OFF | OFF |
| ON | ON | ON | ON | ON | OFF | ON |

When the laser beam LW is incident on the light receiving element 42, the horizontal synchronous signal BDW is outputted from the terminal 68. When the laser beam LR is incident to the light receiving element 42, the horizontal synchronous signal BDR is outputted, from the terminal 70. If both the beams LW and LR are incident on the light receiving element 42, both horizontal synchronous signals BDW and BDR are outputted. Thus, the horizontal synchronous signal for each beam can be generated independent of the other beam. This allows the image reading and image forming operations to be executed independently of each other.

As described above, a single light receiving element 42 and associated logic circuitry is used to provide the horizontal synchronous signal for both the image reading scanning system and image forming scanning system. This reduces the number of parts required to manufacture the optical scanning system.

further, since the directions of the laser beams LR and LW are respectively determined by the inclination of the beam splitter 36 (dichroic mirror) and the mirror 24, the photoconductive drum PD and the surface SR of the object to be scanned can be arranged at various positions, as illustrated in the second and third embodiments described below.

Figure 10:
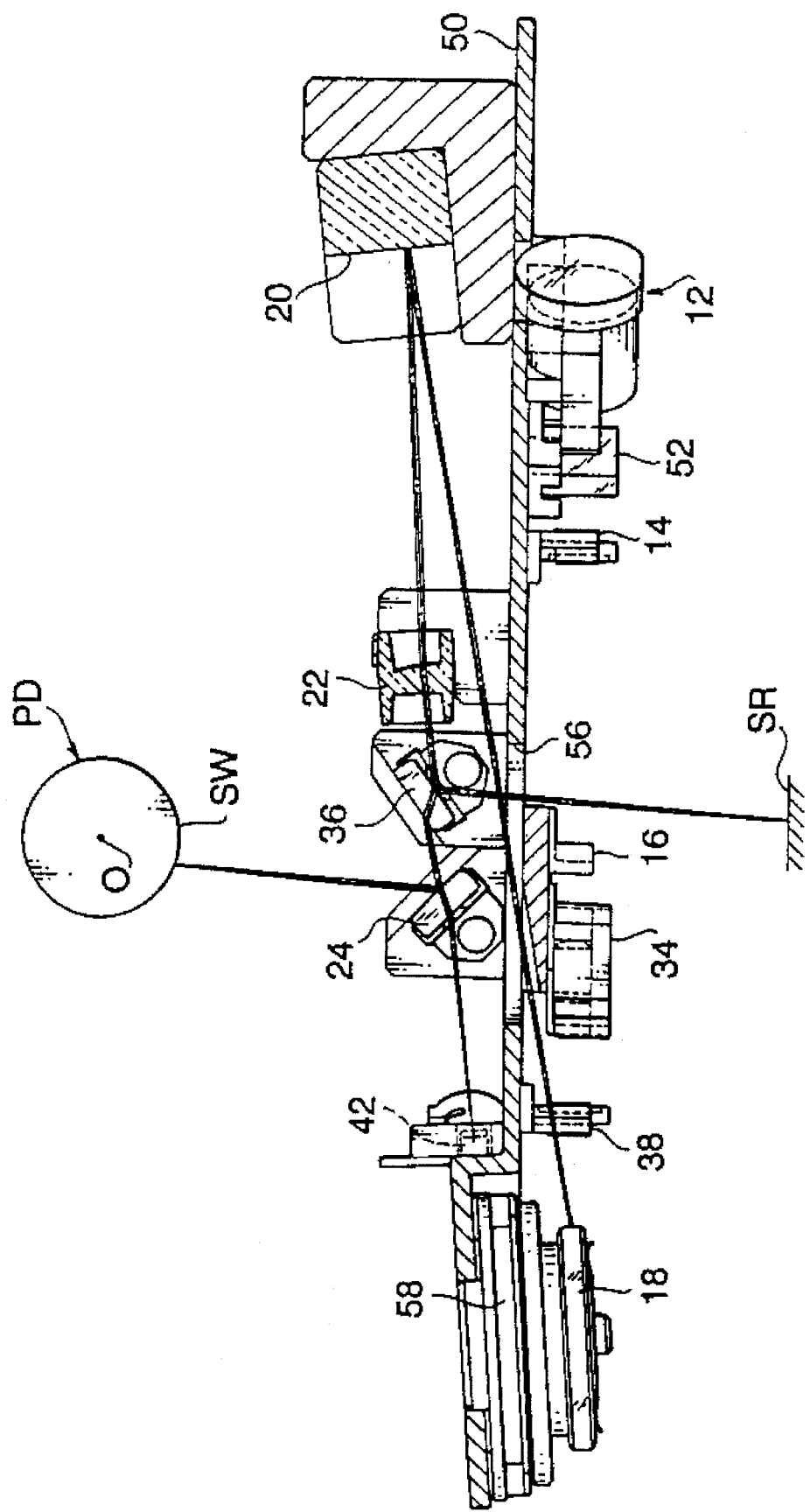
FIG. 10 shows a side view of an optical scanning unit according to a second embodiment of the present invention.

FIG. 10 shows a second embodiment of the optical scanning system.

In FIG. 10, the laser beam LW is reflected by the mirror 24 as in the first embodiment. In the first embodiment, the reflected laser beams LW and LR are transmitted in the same direction, and are substantially parallel to each other. In the second embodiment, the laser beam LR is reflected by the beam splitter 26 towards the surface SR of the object to be scanned and is located below the base plate 50. The reflected laser beam LW and the reflected beam LR are substantially parallel to each other, but are transmitted in opposite directions.

Figure 11:
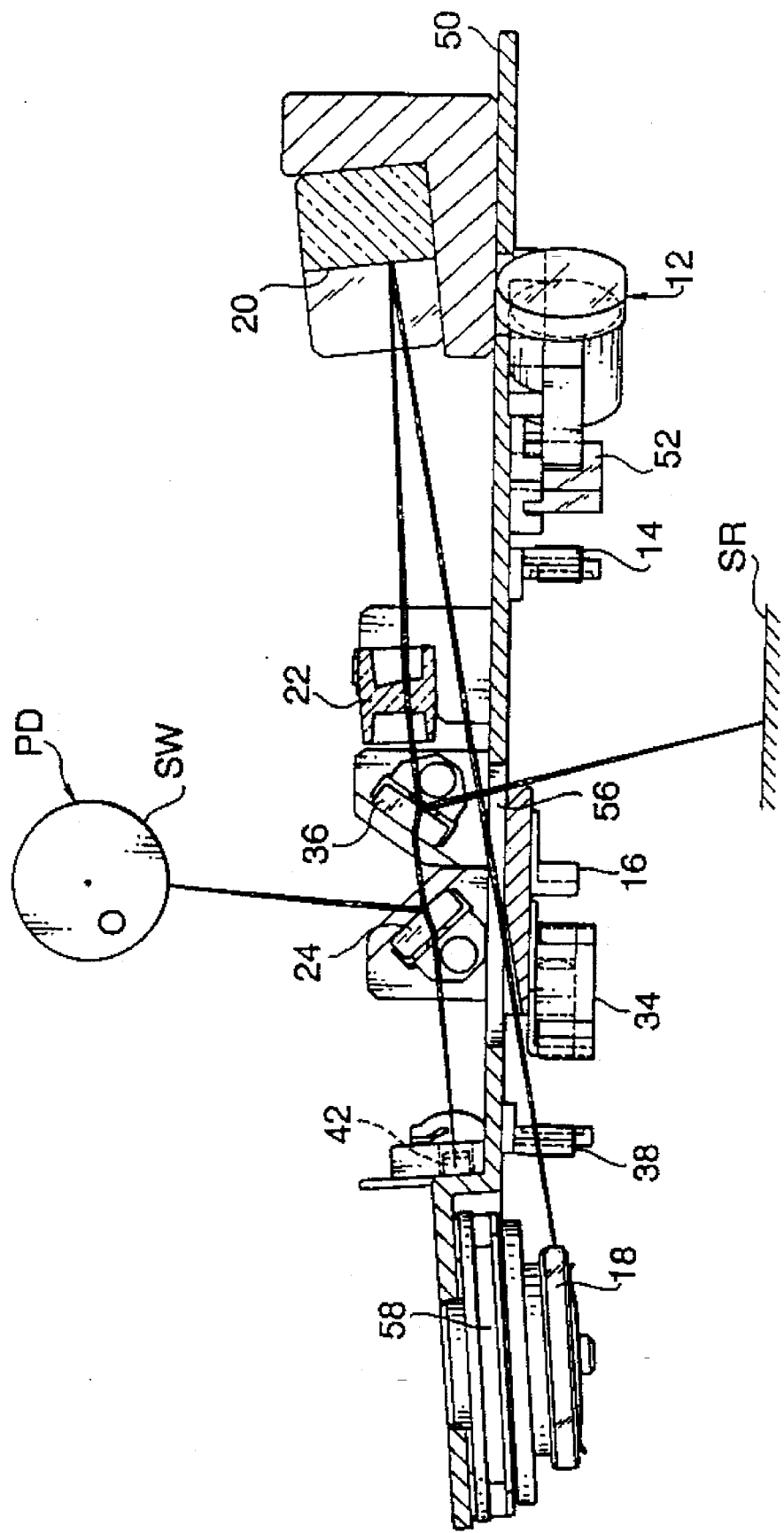
FIG. 11 shows a side view of an optical scanning unit according to a third embodiment of the present invention.

In FIG. 11, a third embodiment o the optical scanning system is shown. In the second embodiment, the angle between the reflected laser beams LW and LR is substantially 180°. As shown in FIG. 11, by changing the angle of the mirror 24 and the beam splitter 36 in the third embodiment, the angle between the reflected laser beam LR and the reflected laser beam LW can be set to any desired value.

The present disclosure relates to subject matters contained in Japanese Patent Application No. HEI 5-350355, filed on Dec. 29, 1993, and Japanese utility Model. Application No. HEI 5-074673, filed on Dec. 29, 1993, which are expressly incorporated herein by reference in their entireties.

What is claimed is:

1. An optical scanning system, comprising:
   an image reading scanning system for emitting a first scanning beam of light to read an image of an object;
   an image forming scanning system for emitting a second scanning beam of light to forman image on a light receiving surface;
   a light receiving element,
   wherein each of said first and second scanning beams is incident on said light receiving element when each of said first and second scanning beams is located at an end portion of a scanning area, and
   wherein said first scanning beam and said second scanning beam have different optical characteristics; and
   a circuit for generating a horizontal synchronous signal for said image reading optical system and said image forming optical system, in accordance with light received by said light receiving element.

2. The optical scanning system according to claim 1, said circuit for generating comprising means for discriminating whether a received beam is said first scanning beam, said second scanning beam, or a combination of said first and said second scanning beams, in accordance with an intensity of the output from said light receiving element.

3. The optical scanning system according to claim 2, said circuit for generating generates a first horizontal synchronous signal for an image reading operation when said received beam is said first scanning beam, and
   said circuit for generating generates a second horizontal synchronous signal for an image forming operation when said received beam is said second scanning beam.

4. The optical scanning system according to claim 1, said image reading scanning system and said image forming scanning system having a common optical path.

5. The optical scanning system according to claim 4, said common optical path including a first beam splitter,
   said image reading scanning system comprising a first emitter for emitting said first scanning beam,
   said image forming scanning system comprising a second emitter for emitting said second scanning beam,
   wherein said first beam splitter combines said first scanning beam and said second scanning beam.

6. The optical scanning system according to claim 5, said common optical path further including a second beam splitter comprising a reflecting portion,
   wherein when said first and said second scanning beams are incident on said reflecting portion, said first scanning beam is reflected toward said object, and
   said second scanning beam passes through said reflecting portion.

7. The optical scanning system according to claim 6, said light receiving element positioned such that when said first and second scanning beams are not incident on said reflecting portion of said second beam splitter, said first and said second scanning beams are incident on said light receiving element.

8. The optical scanning system according to claim 6, said second beam splitter further comprising a transparent portion, wherein when said first and said second scanning beams are not incident on said reflecting portion, said first and said second scanning beams pass through said transparent portion.

9. The optical scanning system according to claim 6, said image forming scanning system further comprising a mirror having a reflecting portion, wherein said mirror reflects said second scanning beam which passes through said second beam splitter and is incident on said reflecting portion of said mirror, said second scanning beam being reflected toward said light receiving surface.

10. The optical scanning system according to claim 9, said light receiving element positioned such that when said second scanning beam is not incident on said reflecting portion of said mirror, said second scanning beam is incident on said light receiving element.

11. The optical scanning system according to claim 9, said mirror further including a transparent portion, wherein said first and said second scanning beams which are not incident on said reflecting portion of said second beam splitter pass through said transparent portion of said mirror and are incident on said light receiving element.

12. The optical scanning system according to claim 9, said second beam splitter and said mirror are arranged such that said second beam splitter reflects said first scanning beam along a first path toward said object, and said mirror reflects said second scanning beam along a second path toward said light receiving surface.

13. The optical scanning system according to claim 12, wherein said first and said second paths are parallel to each other.

14. The optical scanning system according to claim 13, wherein said first and said second paths are 180° out of phase with each other.

15. The optical scanning system according to claim 1, said first scanning beam has a first wavelength, and said second scanning beam has a second wavelength, which is different from said first wavelength.

16. The optical scanning system according to claim 1, said different optical characteristics comprising different light beam intensities;

said generating circuit comprising means for detecting light beam intensity, and for determining, based upon said detected light beam intensity, whether said light received by said light receiving element is said first scanning beam, said second scanning beam, or both said first and second scanning beams.

17. The optical scanning system according to claim 1, said image reading scanning system comprising means for emitting said first scanning beam in a direction toward said object and for receiving light reflected from said object; and said light receiving element positioned such that said first and second scanning beams are incident on said light receiving element when said first and second scanning beams are directed at said end portion of said scanning area.

18. An optical scanning system, comprising:

means for emitting a first scanning beam;

means for emitting a second scanning beam;

first means for reflecting said first scanning beam toward an object to be scanned when said first scanning beam is incident on a predetermined portion of said first reflecting means;

second means for reflecting said second scanning beam toward a light receiving surface on which an image is to be formed when said second scanning beam is incident on a predetermined portion of said second reflecting means; and light receiving means arranged to receive said first and said second scanning beams when said first scanning beam is incident on a portion other than said predetermined portion of said first reflecting means, and when said second scanning beam is incident on a portion other than said predetermined portion of said second reflecting means, wherein said light receiving means outputs a signal used to control said first and second scanning beams.

19. The optical scanning system according to claim 18 further comprising a means for generating a plurality of horizontal synchronous signals for controlling said first scanning beam and for controlling said second scanning beam, in accordance with said output signal.

20. The optical scanning system according to claim 19, said generating means comprising means for discriminating whether a received beam is said first scanning beam, said second scanning beam, or a combination of said first and said second scanning beams, in accordance with an intensity of each of said first and said second scanning beams.

21. The optical scanning system according to claim 19, said plurality of horizontal signals including a first horizontal synchronous signal, generated when said received beam is said first scanning beam, and a second horizontal synchronous signal, generated when said received beam is said second scanning beam.

22. The optical scanning system according to claim 16, said first scanning beam has a first wavelength, and said second scanning beam has a second wavelength, which is different from said first wavelength; and said predetermined portion of said first reflecting means reflects light having said first wavelength and allows light having said second wavelength to pass therethrough.

23. The optical scanning system according to claim 18, said emitting means for emitting said first scanning beam in a direction toward said object to be scanned comprising an image reading scanning system, and further comprising reflected light receiving means for receiving light reflected from said object to be scanned; and said light receiving means positioned such that said first and second scanning beams are incident on said light receiving means when said first and second scanning beams are directed at portions other than said predetermined portion of said first and second reflecting means.

24. An optical scanning system, comprising:

first and second light sources for emitting first and second light beams, said first and second light beams having different optical characteristics;

means for combining said first and second light beams emitted from said first and second light sources;

a deflector for deflecting said first and second light beams combined by said combining means;

an optical system for converging said first and second light beams deflected by said deflector;

a beam splitter for separating said first and second light beam according to said different optical characteristics; and a light receiving element for generating a horizontal synchronous signal, said light receiving element being positioned to receive said first and second light beams when said first and second beams are directed at an end portion of a scanning area.

25. The system of claim 24, said first light beam for reading an image on an object, and said second light beam for forming an image on a light receiving surface.

26. The system of claim 25, a second light receiving element, detecting light reflected from said object, for reading said image on said object.

27. The system of claim 24, said converging optical system comprising a cylindrical mirror and a toric lens.

* * * * *

UNITED STATES PATENT AND TRADEMARK OFFICE
CERTIFICATE OF CORRECTION

PATENT NO. : 5,543,955
DATED : August 6, 1996
INVENTOR(S) : Yoshihiro YAMAZAKI et al.

It is certified that error appears in the above-indentified patent and that said Letters Patent is hereby corrected as shown below:

At column 10, line 20 (claim 1, line 5) of the printed patent, "forman" should be changed to ---form an---.

At column 12, line 39 (claim 22, line 1) of the printed patent, "16," should be changed to ---18,---.

Signed and Sealed this

Twenty-second Day of April, 1997

Attest:

BRUCE LEHMAN

*Attesting Officer*

*Commissioner of Patents and Trademarks*